(12) United States Patent
Perrin et al.

(10) Patent No.: US 11,655,677 B2
(45) Date of Patent: May 23, 2023

(54) FALL ARREST SYSTEM

(71) Applicant: NORTHERN STRANDS CO. LTD., Saskatoon (CA)

(72) Inventors: David Perrin, Dalmeny (CA); Matthias Rossen, Warman (CA); Brad Frehlich, Saskatoon (CA); Douglas Purdy, Meacham (CA); Dayna Gatin, Saskatoon (CA); David Lund, Saskatoon (CA)

(73) Assignee: NORTHERN STRANDS CO. LTD., Saskatoon (CA)

( * ) Notice: Subject to any disclaimer, the term of this patent is extended or adjusted under 35 U.S.C. 154(b) by 174 days.

(21) Appl. No.: 16/755,761

(22) PCT Filed: Jul. 6, 2018

(86) PCT No.: PCT/CA2018/050827
§ 371 (c)(1),
(2) Date: Apr. 13, 2020

(87) PCT Pub. No.: WO2019/071337
PCT Pub. Date: Apr. 18, 2019

(65) Prior Publication Data
US 2020/0277821 A1 Sep. 3, 2020

Related U.S. Application Data

(60) Provisional application No. 62/572,128, filed on Oct. 13, 2017.

(51) Int. Cl.
*E06C 7/18* (2006.01)
*A01F 25/16* (2006.01)
*E04H 7/24* (2006.01)

(52) U.S. Cl.
CPC ............ *E06C 7/186* (2013.01); *A01F 25/163* (2013.01); *E04H 7/24* (2013.01)

(58) Field of Classification Search
CPC ....... E04G 21/3295; E04H 7/24; E06C 7/186; E06C 7/18; E06C 7/181; E06C 7/182;
(Continued)

(56) References Cited

U.S. PATENT DOCUMENTS 3,016,814 A * 1/1962 Beach ..................... A01F 25/16
99/646 R
3,606,226 A * 9/1971 Bell, Sr. .................. E06C 7/488
248/237
(Continued)

FOREIGN PATENT DOCUMENTS

AU 2011100885 A4 8/2011
CA 2181858 A1 1/1998
(Continued)

OTHER PUBLICATIONS

FR 2824578 A1 Machine Translation (Year: 2021).*

*Primary Examiner* — James M Ference
(74) *Attorney, Agent, or Firm* — Dickinson Wright PLLC; Andrew D. Dorisio (57) ABSTRACT

The aspects herein relate to the field of fall prevention systems, and more specifically to fall arrest systems for storage bins and more particularly to grain bins or silos. In one aspect, a fall prevention system for a ladder may have an anchor plate coupled to a roof. In another aspect, the fall prevention system for the ladder may have an anchor bar coupled to at least a portion of the ladder. A rope is coupled at one end to the anchor plate or bar and at the other end to at least one rung of the ladder using a fastener. A rope grab is slidably coupled to the rope between the anchor plate or bar and the fastener.

21 Claims, 8 Drawing Sheets

(58) Field of Classification Search
CPC .......... E06C 7/183; E06C 7/185; E06C 7/187; E06C 7/188; E04B 9/26
See application file for complete search history.

(56) References Cited

U.S. PATENT DOCUMENTS

| | | | | |
|---|---|---|---|---|
| 3,852,943 A * | 12/1974 | Healy | .................... | A62B 35/04 16/257 |
| 3,908,791 A * | 9/1975 | Kleine | .................... | E06C 7/186 182/8 |
| 3,960,283 A * | 6/1976 | Van Dusen | ............ | A01F 25/18 182/128 |
| 4,057,295 A * | 11/1977 | Liet | ...................... | B65D 90/024 52/192 |
| 4,193,475 A * | 3/1980 | Sweet | .................... | E06C 7/187 182/8 |
| 4,542,884 A * | 9/1985 | Dodge, Jr. | ............... | A62B 1/14 254/391 |
| 4,699,245 A * | 10/1987 | Benedet | ............. | E04G 21/3261 182/36 |
| 4,823,912 A * | 4/1989 | Gould | .................... | E06C 7/484 182/107 |
| 5,009,052 A * | 4/1991 | Welch | .................... | B65D 88/08 52/745.01 |
| 5,220,977 A * | 6/1993 | Wolner | ............... | A62B 35/0037 182/18 |
| 5,265,696 A * | 11/1993 | Casebolt | ................ | A62B 35/04 182/8 |
| 5,287,944 A * | 2/1994 | Woodyard | ............ | A62B 35/04 182/3 |
| 5,358,071 A * | 10/1994 | Stennett | .................. | E04D 13/12 182/107 |
| 5,529,144 A * | 6/1996 | Henderson | ......... | A62B 35/0056 182/3 |
| 5,636,704 A * | 6/1997 | Castaneda | ................ | A62B 1/14 182/5 |
| 5,730,407 A * | 3/1998 | Ostrobrod | .......... | A62B 35/0043 182/231 |
| 5,911,287 A * | 6/1999 | Campbell | ................. | E06C 7/12 182/103 |
| 5,924,522 A * | 7/1999 | Ostrobrod | ............... | E06C 7/186 182/191 |
| 5,975,239 A * | 11/1999 | Castaneda | ........... | E04G 21/3261 182/45 |
| 6,098,746 A * | 8/2000 | Castaneda | .......... | A62B 35/0043 182/45 |
| 6,227,329 B1 * | 5/2001 | Ador | .................. | A62B 35/0056 182/3 |
| 6,247,277 B1 * | 6/2001 | Kerpash, Sr. | ............ | A62B 1/22 52/192 |
| 6,722,469 B1 * | 4/2004 | Weger, Jr. | .................. | E06C 1/34 182/107 |
| 7,114,301 B2 * | 10/2006 | Bibaud | ............... | E04D 13/1476 52/220.8 |
| 7,752,719 B2 * | 7/2010 | Howard | .................. | F16G 11/14 24/132 AA |
| 8,261,878 B2 * | 9/2012 | Grome | ................. | E04H 7/065 182/9 |
| 8,348,014 B2 * | 1/2013 | Kerstetter, Jr. | ........... | E06C 7/48 182/8 |
| 8,387,319 B1 * | 3/2013 | Gilles-Gagnon | ....... | F24S 25/33 52/173.3 |
| 8,413,764 B1 * | 4/2013 | Cohen | .................... | E06C 7/183 182/63.1 |
| 8,434,278 B1 * | 5/2013 | Dueck | ....................... | E04H 7/22 220/636 |
| 8,511,036 B2 * | 8/2013 | O'Donnell | ............ | E04G 21/3285 52/712 |
| 8,875,839 B1 * | 11/2014 | Licea | .................. | A62B 35/005 182/8 |
| 9,103,136 B2 * | 8/2015 | Poore | ..................... | A01F 25/163 |
| 9,194,129 B2 * | 11/2015 | O'Donnell | ............ | E04G 21/328 |
| 9,784,034 B2 * | 10/2017 | Short | .................. | A62B 35/0093 |
| 10,486,002 B1 * | 11/2019 | Drinkwater | ............... | E06C 7/18 |
| 2002/0014370 A1 * | 2/2002 | Casebolt | .................. | A62B 1/14 182/8 |
| 2002/0088668 A1 * | 7/2002 | Moore | ...................... | E06C 7/48 182/107 |
| 2004/0129494 A1 * | 7/2004 | Cherpitel | ................. | A62B 1/14 182/5 |
| 2005/0045421 A1 * | 3/2005 | Gaines | .................... | E06C 7/482 182/107 |
| 2005/0189171 A1 * | 9/2005 | Bos | ...................... | E04G 21/3276 182/36 |
| 2005/0284703 A1 * | 12/2005 | Deuer | .................... | E06C 7/186 182/206 |
| 2006/0000674 A1 * | 1/2006 | McIntire | .................. | E06C 7/18 182/129 |
| 2006/0059844 A1 * | 3/2006 | Ely | ........................ | E04G 21/3276 52/698 |
| 2007/0045045 A1 * | 3/2007 | Deuer | .................... | F03D 80/00 182/8 |
| 2007/0193824 A1 * | 8/2007 | Anderson | ................ | E06C 9/02 182/8 |
| 2007/0278040 A1 * | 12/2007 | Rager | ...................... | E06C 7/48 182/107 |
| 2010/0044151 A1 * | 2/2010 | Vollenweider | .......... | E06C 7/187 182/8 |
| 2010/0155176 A1 * | 6/2010 | Lohr | ......................... | E06C 9/02 182/116 |
| 2010/0326768 A1 * | 12/2010 | Kerstetter, Jr. | ........... | E06C 7/48 182/5 |
| 2013/0087669 A1 * | 4/2013 | Daddio | ............... | E04G 21/3276 248/237 |
| 2013/0206940 A1 * | 8/2013 | Hopkins | ............. | E04G 21/3214 248/237 |
| 2014/0027202 A1 * | 1/2014 | Bancroft | .................. | E06C 7/48 182/107 |
| 2015/0075907 A1 * | 3/2015 | Moss | ........................ | E06C 7/48 182/129 |
| 2015/0275580 A1 * | 10/2015 | Canfield | ................. | E06C 7/186 182/8 |
| 2016/0047167 A1 * | 2/2016 | Shuch | ..................... | E06C 7/186 182/8 |
| 2016/0114199 A1 * | 4/2016 | Bogardus, Jr. | ...... | A62B 35/0043 182/3 |
| 2016/0251152 A1 * | 9/2016 | Krupa | .................... | B65D 88/32 206/386 |
| 2017/0260762 A1 * | 9/2017 | Ostrobrod | ............. | F16D 63/008 |
| 2020/0277821 A1 * | 9/2020 | Perrin | ..................... | E06C 7/186 |

FOREIGN PATENT DOCUMENTS

| | | | | |
|---|---|---|---|---|
| CA | 2280436 A1 | | 2/2001 | |
| CN | 206144457 U | | 5/2017 | |
| EP | 3722539 A1 * | | 10/2020 | .......... A62B 35/005 |
| ES | 2385530 A1 * | | 7/2012 | ............. A62B 35/04 |
| FR | 2824578 A1 | | 11/2002 | |
| GB | 2409492 A * | | 6/2005 | ............... E06C 7/18 |
| GB | 2450725 A * | | 1/2009 | ............. E04D 15/00 |
| GB | 2543593 A * | | 4/2017 | ............. E06C 7/186 |
| JP | 2011174301 A | | 9/2011 | |
| KR | 101209868 B1 | | 12/2012 | |
| WO | WO-9949154 A1 * | | 9/1999 | ......... E04G 21/3261 |
| WO | WO-2004103473 A1 * | | 12/2004 | ........... A62B 35/005 |
| WO | WO-2011133038 A2 * | | 10/2011 | ........ E04G 21/3276 |
| WO | 2013135929 A1 | | 9/2013 | |
| WO | WO-2014205479 A1 * | | 12/2014 | ............. E06C 7/186 |

* cited by examiner

FALL ARREST SYSTEM

RELATED

The present application claims priority from U.S. Provisional No. 62/572,128, filed on Oct. 13, 2017, the contents of which are explicitly incorporated by reference in its entirety.

FIELD

The aspects described herein relate to the field of fall prevention systems, and more specifically to fall arrest systems for storage bins and more particularly to grain bins or silos.

BACKGROUND

U.S. Pat. No. 6,247,277 to Kerpash discloses a grain storage safety net system and method designed to reduce or prevent accidents involving grain storage bins. The safety net system includes a wide mesh netting which is secured to the inside periphery of a grain bin via a plurality of anchors.

U.S. Pub. No. 2013/0087669 to Daddio discloses a dual-purpose roof safety anchor including an elongated base plate and a flange connected to the mid-section of the base plate and extending outwardly therefrom. A hole in the flange engages a workman's safety line. A series of fastening holes are formed in the base plate and aligned with the central longitudinal axis of the base plate. The holes can be used to fasten the base plate to a wooden rafter of a wooden roof structure.

U.S. Pat. No. 6,227,329 to Ador discloses a safety line anchorage having a base plate adapted to be secured to a support structure. A transverse plate is secured to the base plate and extends outwardly from the base plate. A slot is formed in the transverse plate to receive a ring. A notch is formed in a sidewall of the slot to seat the ring within the slot. The ring is adapted to anchor the end of a safety line regardless of the orientation of the base plate relative to the desired orientation of the safety line.

A safety-featured ladder is described in U.S. Pat. No. 8,348,014 to Kerstetter. The ladder includes a taught rope wrapped over the top of the top rung and under the bottom of the bottom rung and fixedly connected to the ladder when downward force is applied to the rope in front of the ladder. A sleeve including a pulley subsystem is attached to a body harness worn by a climber and can move or slide along the rope only when climbing up the ladder. The climber ascends the ladder to the desired height as the moveable sleeve follows-along.

U.S. Pat. No. 5,287,944 to Woodyard discloses a fall arrest system having one or more roof mounted anchors permanently installed. Each roof mounted anchor has a base member formed to fit a roof and having spaced holes to receive screw fasteners to secure the anchor to the roof structure. An integral upright anchoring eyelet structure secured to the base member in the centre portion thereof and having an eyelet to receive portions of a cable, or hook.

U.S. Pub. No. 2015/0275580 to Canfield discloses a fall arrest system for use on a ladder. The fall arrest system includes a primary rope line on which a fall arrester is slidably mounted, and a pair of anchor assemblies that securely extend and connect between the primary rope line and respective legs of the ladder. A body harness worn by a worker climbing the ladder is tethered to the fall arrester.

SUMMARY

According to a first broad aspect of the present invention, there is provided a fall prevention system for a ladder comprising: an anchor plate coupled to a roof; a rope coupled at one end to the anchor plate; a fastener for coupling another end of the rope to at least one rung of the ladder; and a rope grab slidably coupled to the rope between the anchor plate and the fastener.

In some exemplary embodiments of the first aspect, the system further comprises a lanyard coupled to the rope grab, and some exemplary systems may further comprise a harness coupled to the lanyard. The anchor plate is preferably sized to fit across at least two ribs extending downward from a peak of the roof, and the anchor plate may be planar or trapezoidal in shape. The anchor plate may further comprise a plurality of orifices through the anchor plate and along at least two edges of the anchor plate; such orifices may comprise slotted holes that are transverse to the ribs when the anchor plate is installed on the roof, and each of the orifices may receive a bolt passing through the anchor plate and a hole through at least one of the ribs. Such a bolt may additionally pass through at least one washer, and the at least one washer may seal the hole through the at least one of the ribs. In some exemplary embodiments, the anchor plate is integrally formed with the roof. The fastener may, in some embodiments, comprise at least two rope clips. The rope preferably couples to the anchor plate using a connection loop and a shackle. The rope grab is preferably removable from the rope.

According to a second broad aspect of the present invention, there is provided a silo comprising: at least one wall extending upward from a base to a roof; a ladder extends from a bottom of the at least one wall to the roof; and a fall prevention system according to any of the above embodiments of the first broad aspect.

Other aspects may be apparent to one of skill in the art upon reviewing the description and drawings herein.

DESCRIPTION OF THE DRAWINGS

While the invention is claimed in the concluding portions hereof, exemplary aspects are provided in the accompanying detailed description which may be best understood in conjunction with the accompanying diagrams where like parts in each of the several diagrams are labeled with like numbers, and where:

DETAILED DESCRIPTION

Figure 1:
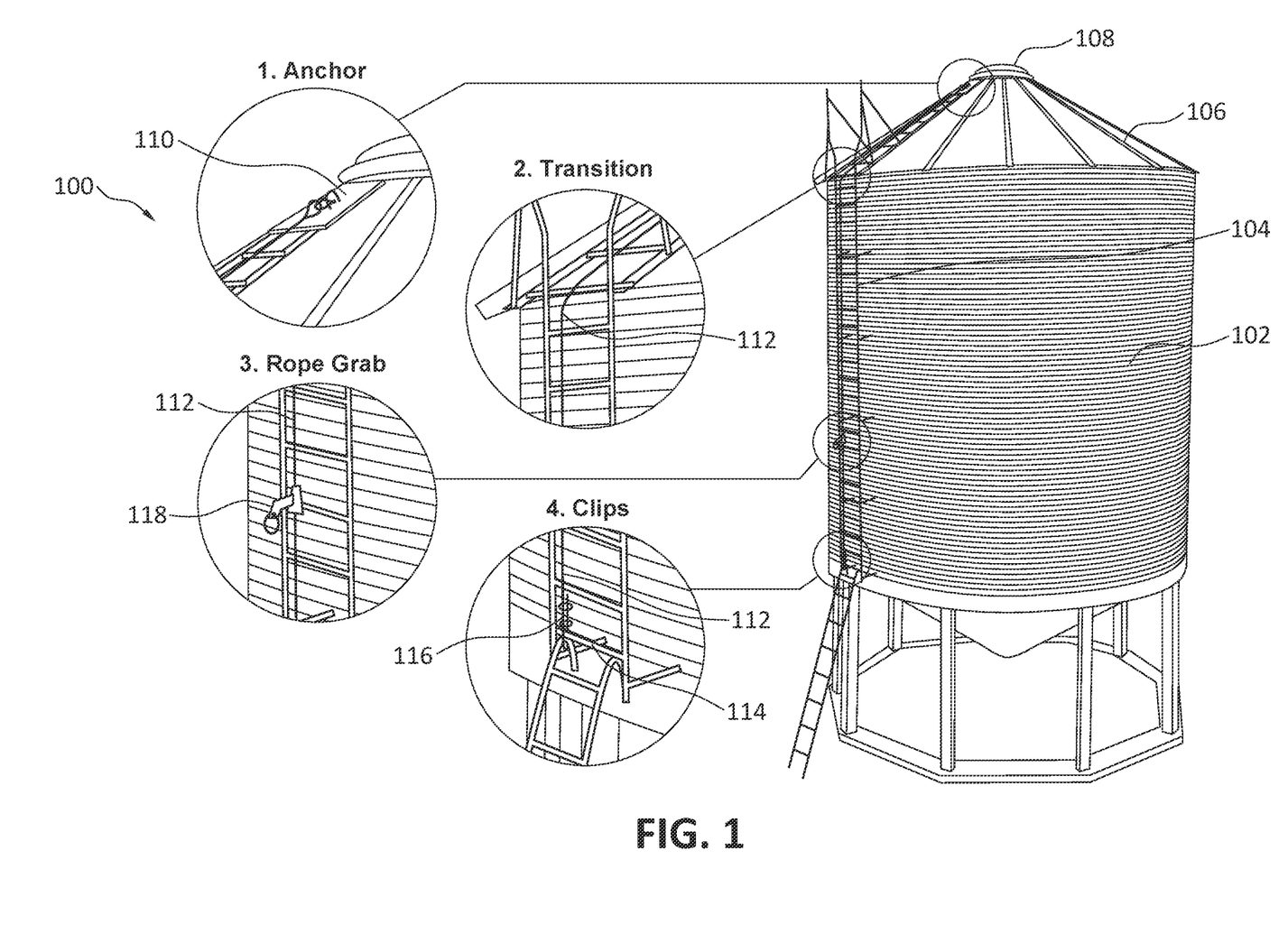
FIG. 1 is a perspective side view of a silo demonstrating a relative position of components of a fall arrest system.

With reference to FIG. 1, a grain bin or silo 102 stores bulk materials such as grain or silage, but may store other products such as woodchips, food products, or sawdust. These silos 102 may comprise a general cylindrical wall surrounding a base (not shown) and a conical-shaped roof 106 having one or more roof apertures 108. Other aspects may have differently shaped silos 102. The silos 102 may be constructed of steel, aluminum, and/or concrete. These types of silos 102 are commonly provided with exterior ladders 104 allowing access to the roof 106 and roof apertures (or hatches) 108. The ladders 104 are known to present a fall risk that sometimes results in death. In this particular illustrated aspect, the grain bin 102 is a Westeel/Westor 1805 grain bin.

Figure 6:
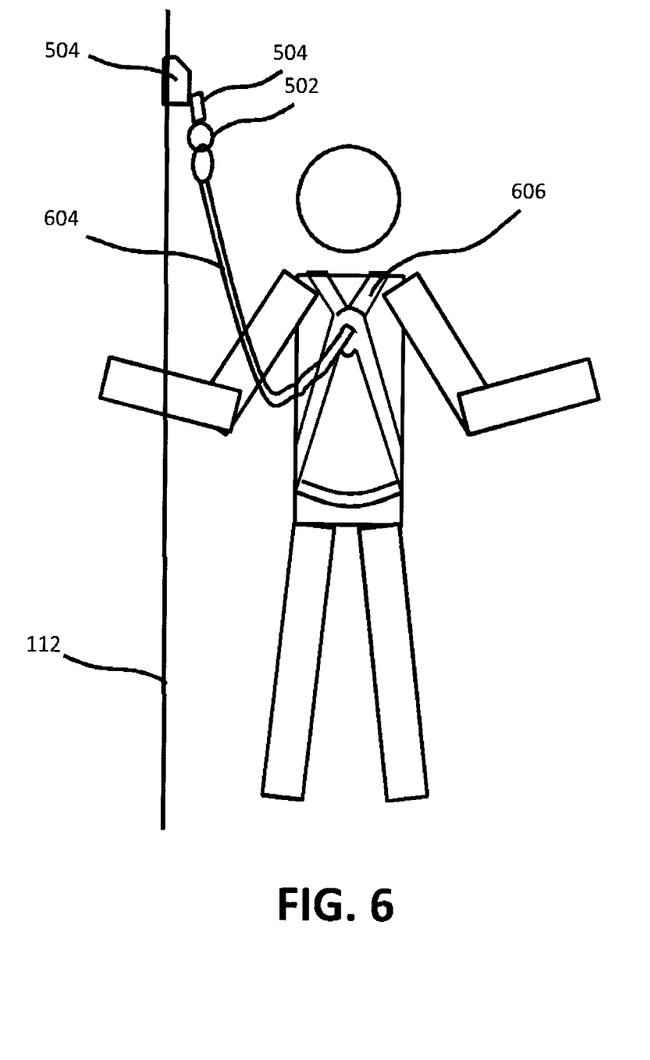
FIG. 6 is a schematic depiction of a harness, lanyard, and the rope grab.

A fall prevention system 100 may comprise an anchor plate 110 for mounting on the bin roof 106. Once the plate 110 is installed, a rope 112, in this aspect a wire rope, may be attached to the plate 110 and run down along the ladder 104. The rope 112 may be secured around a bottom rung 114 of the ladder 104 using rope clips 116 or other type of fastener. The rope clips 116 or other type of fastener may maintain the rope 112 under some tension to make the travel of the rope grab 118 easier and/or to keep the rope 112 in one place. In this aspect, the wire rope 112 may be ⅜-inch braided wire rope. As shown in further detail in FIG. 6, a user may wear a full body harness 606 and, in this aspect, a 4-ft shock-absorbing lanyard 604 to attach to the fall prevention system 100. The lanyard 604 may be attached by a locking snap hook (not shown) to a dorsal D-ring (not shown), which is located between the shoulder blades of the user. A static wire rope grab 118 may be attached to the rope 112 and the user attaches their lanyard to the rope grab 118. Once attached, the user may be able to travel up and down the ladder 104. The fall prevention system 100 may provide the user with 100% tie-off while climbing up and down the ladder 104. If a user falls, the rope grab 118 may lock on to the rope 112 and stop the user from hitting the ground.

Figure 2:
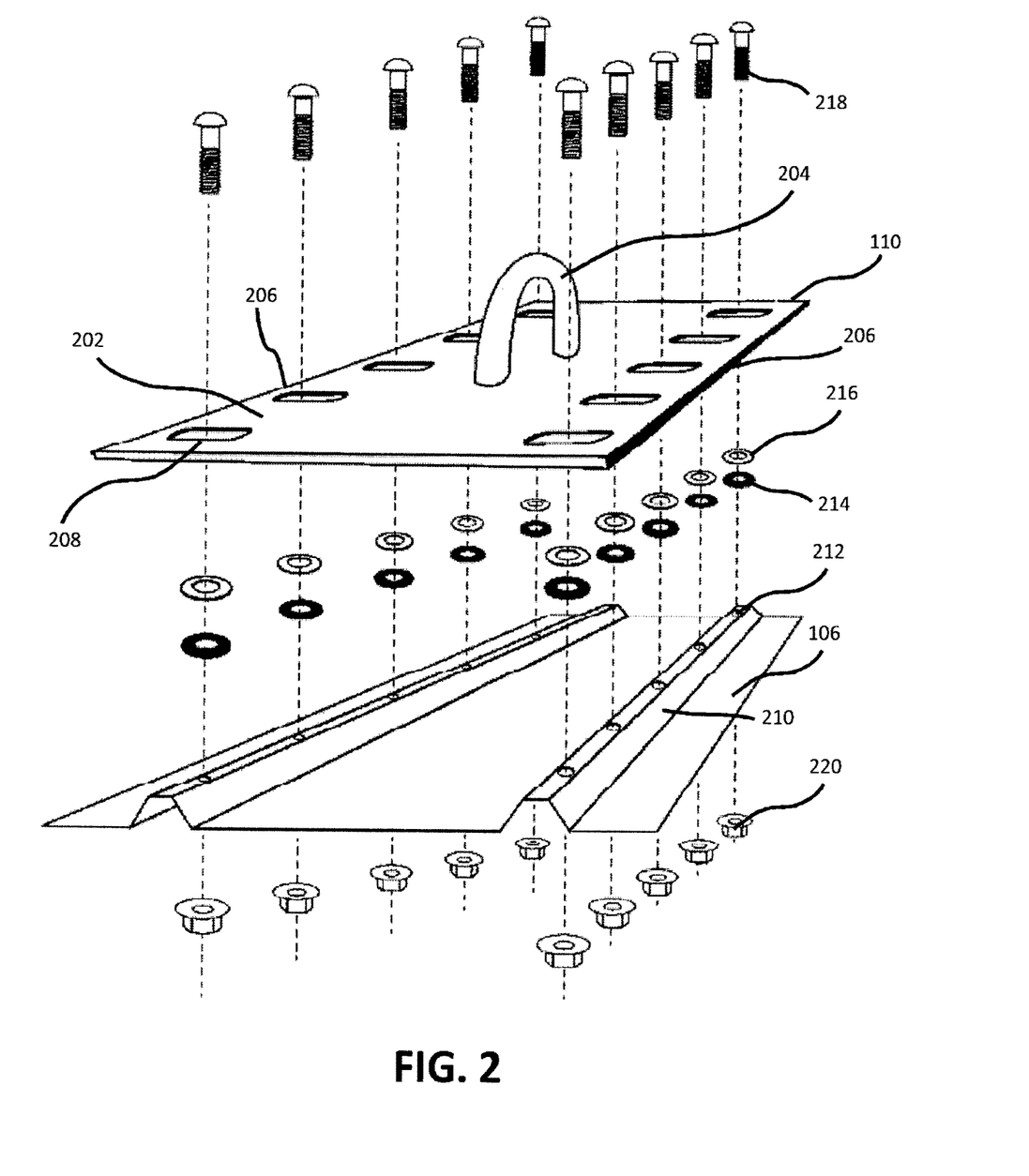
FIG. 2 is an exploded diagram of an anchor plate for the fall arrest system mounted to a roof of the silo.
Figure 3A:
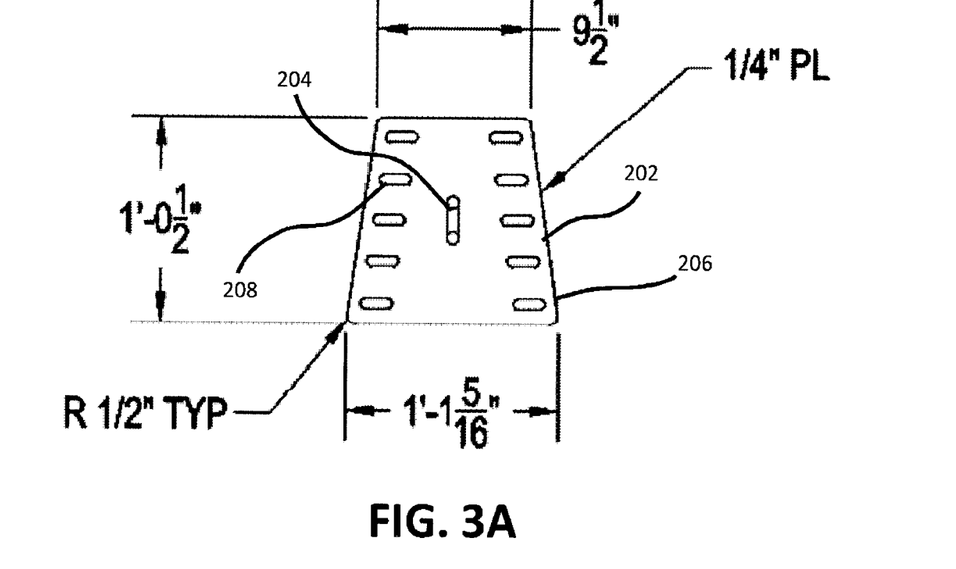
FIG. 3A is a top plan view of the anchor plate.
Figure 3B:
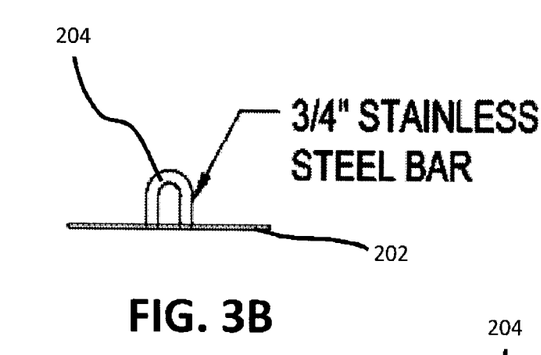
FIG. 3B is a side elevation view of the anchor plate.
Figure 3C:
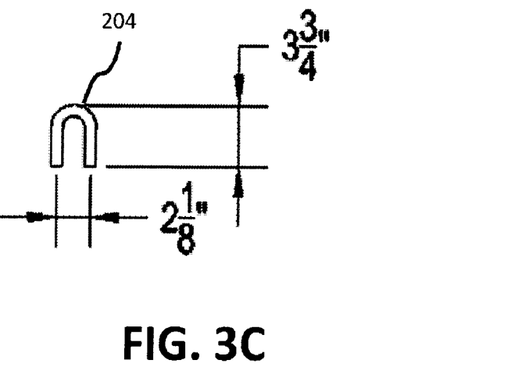
FIG. 3C is a side elevation view of a cable attachment ring of the anchor plate.
Figure 3D:
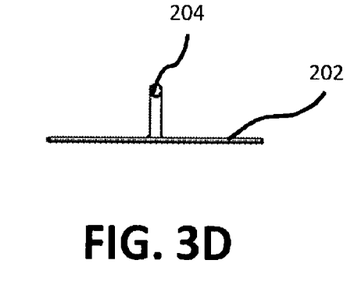
FIG. 3D is a side elevation view of the anchor plate.
Figure 3E:
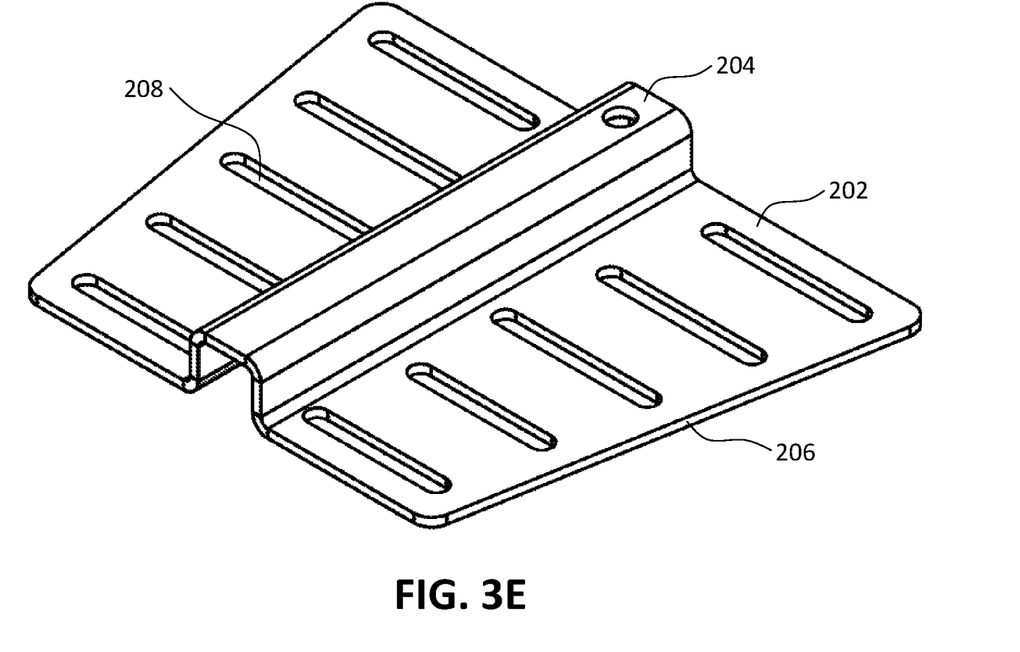
FIG. 3E is a perspective view of the anchor plate according to another aspect.

Turning to FIGS. 2 and 3A to 3E, the anchor plate 110 is depicted in more detail. The anchor plate 110 may comprise a generally planar plate 202 that when viewed from the front (as shown in FIG. 3A) may be trapezoidal in shape. In this aspect, the planar plate 202 may be composed of 44w steel and have a thickness of ¼-inch, a length of 12½-inches and parallel sides of 13 5/16-inches and 9½-inches. A connection loop 204 may extend generally perpendicular to the planar plate 202 and may be centrally located on the planar plate 202. In this aspect, the loop 204 has a loop opening transverse to the non-parallel sides 206. The loop 204 may be welded to the planar plate 202 or in other aspects, may be bolted to or integrally formed with the planar plate 202, such as by casting the anchor plate 110 in a mold. In this aspect, the loop 204 may be formed from a ¾-inch stainless steel bar with a length of 3¾-inches and a width of 2⅛-inch. In some aspects, the loop 204 may be made from a corrosion resistant metal such as stainless steel. The anchor plate 110 may be hot-dip galvanized.

A plurality of mounting orifices 208 through the planar plate 202 may be located along the non-parallel sides 206. The orifices 208 may comprise slotted holes in the planar plate 202 to enable the anchor plate 110 to be mounted to at least one rib 210 of different types of silos 102. The slotted holes 208 may be generally transverse to the non-parallel sides 206 of the trapezoidal plate 202. In this aspect, ten mounting orifices 208 are present with each orifice 208 being an equal distance from the closest non-parallel side 206. In other aspects, the orifices 208 may be circular and particular to a single type of silo 102. An angle of the non-parallel sides 206 to the parallel sides may be approximately equal to that of the angle of the ribs 210 of the roof 106 of the silo 102 to an outer edge of the silo 102.

During installation, the anchor plate 110 may be placed about 3-inches down from the top of a hatch ring 108 and a plurality of rib holes 212 may be marked along the ribs 210 of the roof 106 of the silo 102, as shown in FIG. 2. The plurality of rib holes 212 may be drilled through the ribs 210 at the marked locations. In this aspect, the rib holes 212 may be 9/16-inch holes. A plurality of rubber washers 214 may be aligned with each of the rib holes 212. The rubber washers 214 may prevent moisture from entering the silo 102. A plurality of metal washers 216 may then be aligned with the rib holes 212 and placed on top of the plurality of rubber washers 214. In some aspects, the rubber washers 214 may also comprise an adhesive (not shown) to temporarily secure the rubber washers 214 in position and/or may secure the metal washers 216 in position. The anchor plate 110 may then be positioned on top of the washers 214 and 216 such that the orifices 208 may be generally aligned with the rib holes 212. A plurality of bolts 218 may be placed through the orifices 208, washers 214, 216, and rib holes 212. On the interior of the silo 102, a plurality of nuts 220 may be fastened to the bolts 218 using a wrench. In this aspect, the bolts are ½-inch carriage bolts 218 with compatible flange nuts 220.

Figure 4A:
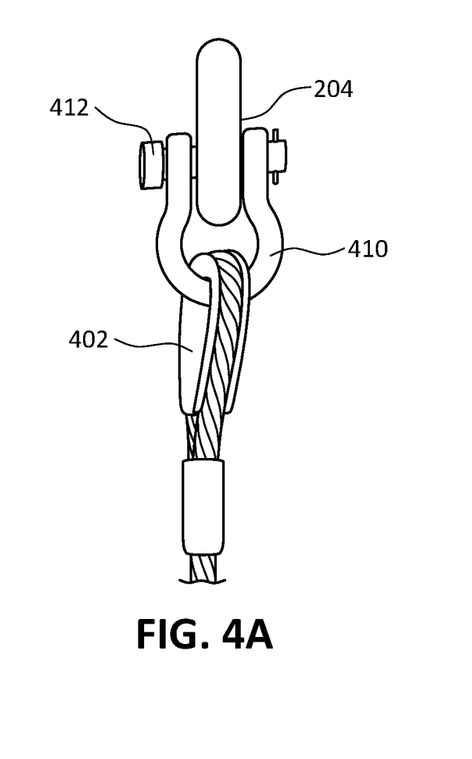
FIG. 4A is a photograph of a front view of a shackle attached to the cable attachment ring of the anchor plate.
Figure 4B:
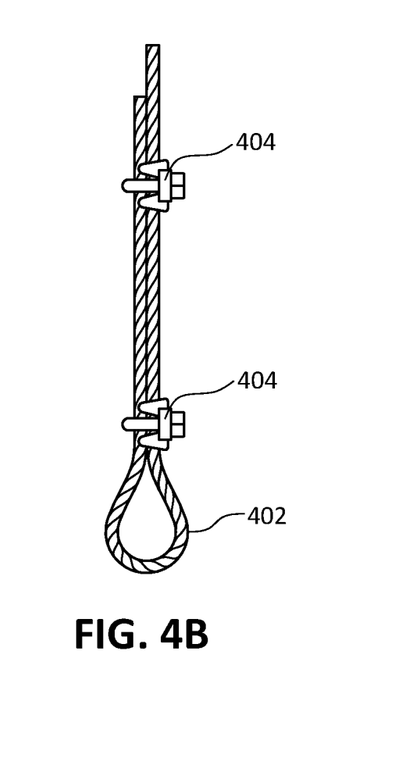
FIG. 4B is a side view of the cable attachment at the bottom of the silo.
Figure 5:
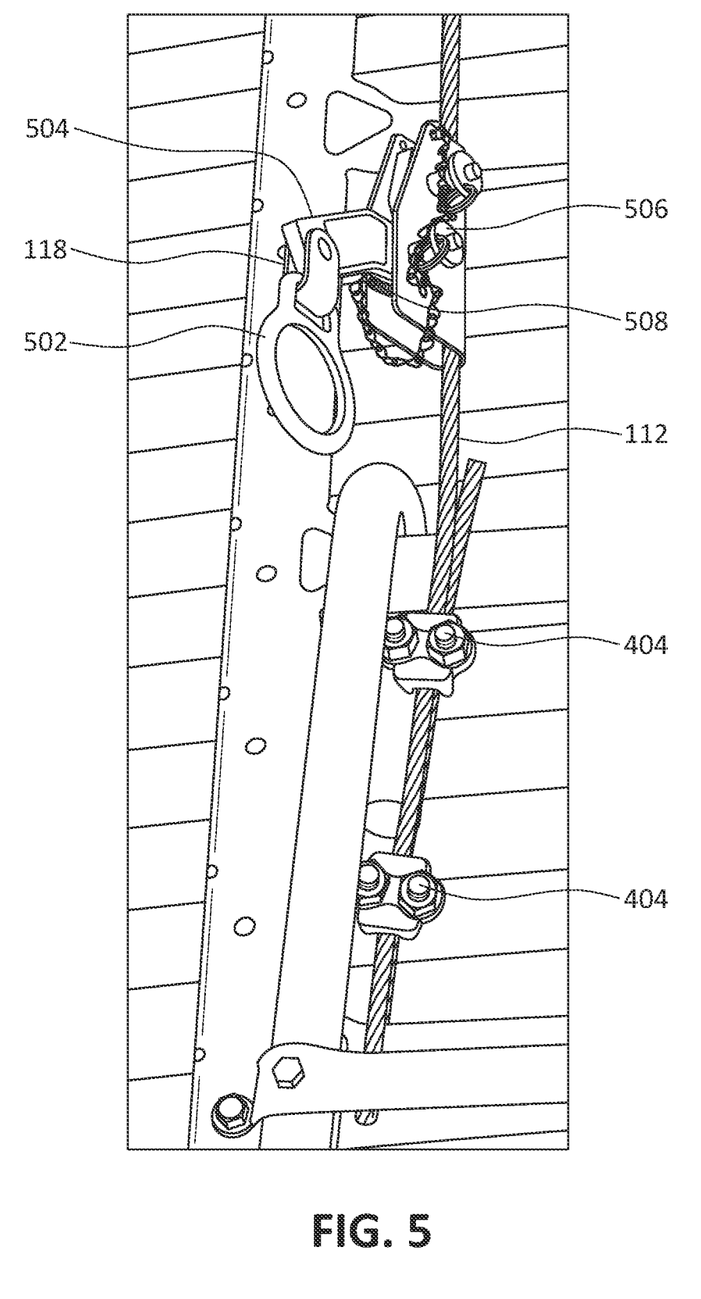
FIG. 5 is a photograph of a top right perspective view of a rope grab and a bottom cable attachment.

In FIG. 4A, a shackle 410, which is used to connect the rope 112 (e.g. vertical lifeline), may be placed around the loop 204 and secured with a clevis pin or bolt 412 and a cotter pin (not shown). In this aspect, the rope 112 may comprise ⅜-inch 7×19 galvanized wire rope. The rope 112 may then be run down one side of the ladder 104 to the bottom rung 114. As shown in FIG. 4B and FIG. 5, the rope 112 may be looped around the bottom rung 114 and may be attached back to the rope 112 using two or more rope clips 404. The rope 112 may be snug, but not so tight that the user would have difficulty moving the rope grab 118 past the roof overhang (shown as "2. Transition" in FIG. 1) at the top of the ladder 104. The rope clips 404 may be torqued to 45 ft-lbs.

In some aspects, a metal guide 402, having a smooth surface, may be placed around the bottom rung 114 and the rope 112 may be wrapped around the metal guide 402. In some aspects, the metal guide 402 may be placed around the shackle 410. The metal guide 402 may help prevent fraying and/or wear of the rope 112 by the bottom rung 114. In other aspects, the rope 112 may not necessarily be secured to the bottom rung 114, but rather be secured to a rung located close enough to the ground so that someone falling from such a height would most likely be uninjured or sustain only minor injuries.

Turning to FIG. 5, the static rope grab 118 may be attached to the rope 112. In this aspect, the rope grab 118 is manufactured by DBI Industries, Inc. (now owned by 3M). An attachment D-ring 502 may be provided to allow the user to attach the lanyard 604. In this aspect, the lanyard length may be less than four feet. A wedge/handle 504 may be coupled or integrally formed with the attachment ring 502. When the handle 504 is pressed in an upward direction, the rope grab 118 may be released from the rope 112 in order to allow the rope grab 118 to slide up or down the rope 112. A spring 508 may maintain the handle 504 in a downward position in order for the rope grab 118 to be held in position along the rope 112. In this manner, the rope grab 118 does not move by itself and must be adjusted by the user as they ascend and descend the ladder 102. Any downward force on the rope grab 118 may cause the rope grab 118 to secure unless the user has pressed the handle 504 in the upward direction. One or more detent pins 506 may fasten the rope grab 118 to the rope 112 so that the rope grab 118 does not come off the rope 112 during sliding. The detent pins 506 may allow the rope grab 118 to be removed from the rope 112 when not in use.

Figure 7:
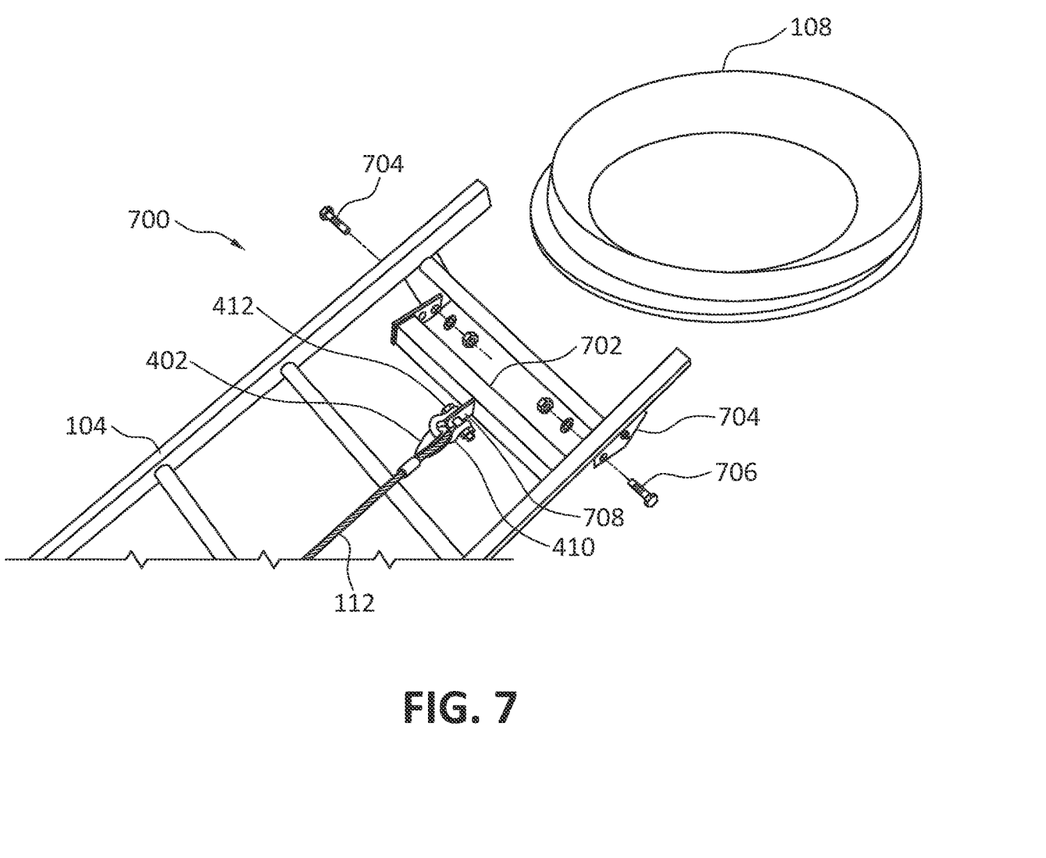
FIG. 7 is a perspective view of an anchor bar for the fall arrest system.
Figure 8:
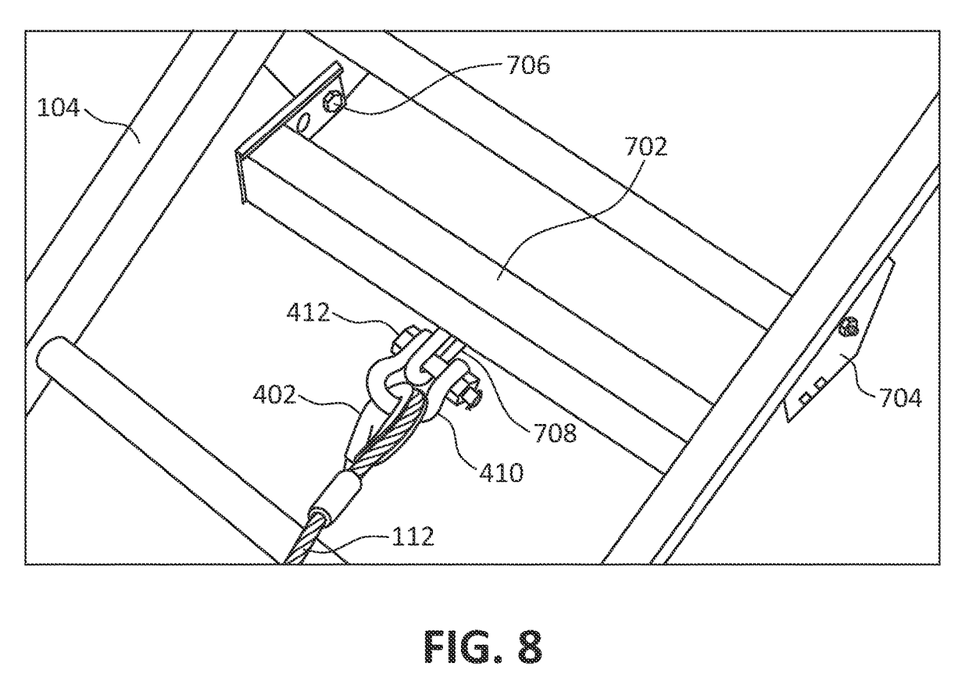
FIG. 8 is an enlarged view of the anchor bar for the fall arrest system.

According to another aspect 700 depicted in FIGS. 7 and 8, an anchor bar 702 may be bolted or fastened using a fastener 706, in this aspect a bolt, washer, and nut, to an attachment point 704 of the ladder 104. The anchor bar 702 may be applicable to silos 102 having a smooth exterior surface but may be applied to other types of silos 102. The attachment point 704 may hold the ladder 104 to the silo roof 106. In other aspects, the anchor point 704 may be a position along the ladder 104. In this aspect, the attachment point 704 is located at the rung closest to the opening 108 to the silo 102. The anchor bar 702 may be approximately the width of the rungs of the ladder 104. In this aspect, the anchor bar 702 may telescope or extend in order to fit different ladder sizes. The anchor bar 702 may comprise the connection tab 708 having a hole there through. The tab 708 may be metal and may be welded to (or integrally formed from) the outside sleeve of the extendable anchor bar 702. The shackle 410, which is used to connect the rope 112 (e.g. vertical lifeline), may be placed around the loop 204 and secured with a clevis pin or bolt 412 and a cotter pin (not shown). The metal guide 402 may be placed around the shackle 410.

In some aspects, a bin kit may comprise the anchor plate 110, the washers 214, 216, the bolts 218, the nuts 220, the rope 112, and the rope clips 404. In other aspects, the bin kit may comprise the anchor bar 702, fasteners 706, the rope 112, and the rope clips 404. A user kit may comprise the rope grab 118 (including all rope grab components), the lanyard 604, and the harness 606.

In other aspects, a primary kit may comprise the anchor plate 110, the washers 214, 216, bolts 218, the nuts 220, the rope 112, the rope clips 404, and the user kit (e.g. the rope grab 118, the lanyard 604, the harness 606). A secondary kit may comprise the anchor plate 110, the washers 214, 216, the bolts 218, the nuts 220, the rope 112, and the rope clips 404. In this aspect, the rope grab 118, the lanyard 604, and the harness 606 may be transferred from bin 102 to bin 102.

In the aspects described herein, the fall arrest system 100 may be configured for users that are medically fit to sustain fall arrest forces of up to 1800 lbs. while wearing a full body harness 606 having a dorsal D-ring. For example, the fall arrest system 100 as described herein may not be used for people with weak or previously injured backs, pregnant women, or workers with an excess body weight unless first evaluated and approved by a medical professional. In some aspects, an excess body weight may be one greater than 254 lbs. (e.g. including tools and clothing). Users between 254 and 310 lbs. may use the system 100 provided they use an energy absorbing lanyard 604 suitable for their weight. The energy absorbers may have two general categories designed for different user weight ranges (e.g. E4 for users up to 254 lbs. and E6 for workers up to 310 lbs.). In some aspects, users over 310 lbs. may not use the system 100.

In some aspects, the rope grab 118 may be removed and stored when not in use.

In some aspects, the anchor plate 110 may be welded to the ribs 210 during manufacture of the silo 102. In other aspects, the anchor plate 110 may be integrally formed with the silo roof 106, such as during a casting of the silo roof 106. In some aspects, the anchor bar 702 may be welded to the ladder 104 during manufacture of the silo 102. In other aspects, the anchor bar 702 may be integrally formed with the ladder 104 of the silo 102, such as during a casting of the silo ladder 104.

Although the rope 112 described herein is a rope 112 constructed of metal strands of a particular diameter, other aspects may have the rope 112 being a different diameter and/or constructed of different materials, such as carbon fiber, Kevlar™, or other type of synthetic rope 112. Particular types of rope 112 may have additional advantages such as a reduced chance of the ropes 112 being cut on sharp edge of the silo 102 and/or ladder 104. For example, steel rope 112 or Kevlar rope 112 may have this additional advantage. Other types of rope 112 may resist ultraviolet (UV) degradation, such as steel rope 112. If the rope 112 is susceptible to cutting and/or UV degradation, the rope 112 may have to be periodically inspected to ensure safe operation.

Although the aspects herein describe the fall prevention system 100 used on a ladder 104 for a silo 102, other aspects may apply equally well to other types of ladders.

Although the aspects herein describe the fall prevention system 100 configured for use on a cylindrical silo 102 with a conical roof 106, the aspects may apply equally to other types of roofs.

Although the aspects herein describe a pair of rope clips 116 for securing the rope 112 to the bottom rung 114, other aspects may have a rung fastener integrally formed with the ladder 104 for receiving and securing the rope 112.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. A fall prevention system for a ladder having a vertical wall portion and a nonvertical roof portion with respect to a ground surface, the nonvertical roof portion transitioning from the vertical wall portion and extending along a conical roof, comprising:
    an anchor plate coupled to the conical roof;
    a rope coupled at one end to the anchor plate;
    a fastener coupling another end of the rope directly contacting at least one rung along the vertical wall portion of the ladder; and
    a rope grab slidably coupled to the rope between the anchor plate and the fastener; the rope grab automatically secured to the rope at all times until manually adjusted by user intervention.

2. The fall prevention system of claim 1, further comprising a lanyard coupled to the rope grab.

3. The fall prevention system of claim 2, further comprising a harness coupled to the lanyard.

4. The fall prevention system of claim 1, wherein the anchor plate is sized to fit across and to secure to at least two ribs extending downward from a peak of the conical roof.

5. The fall prevention system of claim 4, wherein the anchor plate is planar.

6. The fall prevention system of claim 4, wherein the anchor plate is trapezoidal in shape.

7. The fall prevention system of claim 4, wherein the anchor plate further comprises a plurality of orifices through the anchor plate and along at least two edges of the anchor plate.

8. The fall prevention system of claim 7, wherein the orifices comprise slotted holes that when the anchor plate is installed on the conical roof, the slotted holes are transverse to the ribs.

9. The fall prevention system of claim 7, wherein each of the orifices receive a bolt passing through the anchor plate and a hole through at least one of the ribs.

10. The fall prevention system according to claim 9, wherein the bolt additionally passes through at least one washer.

11. The fall prevention system according to claim 10, wherein the at least one washer seals the hole through the at least one of the ribs.

12. The fall prevention system according to claim 1, wherein the anchor plate is integrally formed with the conical roof.

13. The fall prevention system according to claim 1, wherein the fastener comprises at least two rope clips.

14. The fall prevention system according to claim 1, wherein the rope couples to the anchor plate using a connection loop and a shackle.

15. The fall prevention system according to claim 1, wherein the rope grab is removable from the rope.

16. A silo comprising:
   the fall prevention system according to claim 1;
   at least one wall extending upward from a base to the conical roof; and
   the ladder extends from a bottom of the at least one wall to the conical roof.

17. The fall prevention system according to claim 1, wherein the rope comprises: a vertical portion with respect to a ground surface along the ladder and a nonvertical portion along the roof.

18. A fall prevention system for a ladder having a vertical wall portion and a nonvertical roof portion with respect to a ground surface, the nonvertical roof portion transitioning from the vertical wall portion and extending along a conical roof, comprising:
   an anchor bar coupled to at least the nonvertical roof portion of the ladder;
   a rope coupled at a first end to the anchor bar;
   a fastener coupling the rope at a second end and directly contacting at least one rung along the vertical wall portion of the ladder;
   a rope grab slidably coupled to the rope between the anchor bar and the fastener; the rope grab automatically secured to the rope at all times until manually adjusted by user intervention; and
   the rope couples to the anchor bar using a connection loop and a shackle.

19. The fall prevention system of claim 18, further comprising a lanyard coupled to the rope grab; and a harness coupled to the lanyard.

20. The fall prevention system according to claim 18, wherein the anchor bar is integrally formed with the ladder.

21. The fall prevention system according to claim 18, wherein the rope comprises: a vertical portion with respect to a ground surface along the ladder and a nonvertical portion along the roof.

* * * * *